United States Patent
Brock

(10) Patent No.: US 9,322,391 B2
(45) Date of Patent: Apr. 26, 2016

(54) HOUSING FOR A HIGH EFFICIENCY WIND TURBINE

(71) Applicant: SkyWolf Wind Turbine Corp., Geneseo, NY (US)

(72) Inventor: Gerald E. Brock, Livonia, NY (US)

(73) Assignee: SKYWOLF WIND TURBINE CORP., Geneseo, NY (US)

( * ) Notice: Subject to any disclaimer, the term of this patent is extended or adjusted under 35 U.S.C. 154(b) by 841 days.

(21) Appl. No.: 13/670,528

(22) Filed: Nov. 7, 2012

(65) Prior Publication Data

US 2013/0064654 A1    Mar. 14, 2013

Related U.S. Application Data

(63) Continuation-in-part of application No. 13/094,952, filed on Apr. 27, 2011, now Pat. No. 8,721,279, and a continuation-in-part of application No. 13/238,217, filed on Sep. 21, 2011, now Pat. No. 8,672,624, and a continuation-in-part of application No. 13/293,326, filed on Nov. 10, 2011, now Pat. No. 8,851,836.

(51) Int. Cl.
*F03D 1/04*    (2006.01)
*F03D 1/02*    (2006.01)

(52) U.S. Cl.
CPC ........ *F03D 1/025* (2013.01); *F03D 1/04* (2013.01); *F05B 2240/133* (2013.01); *Y02E 10/72* (2013.01)

(58) Field of Classification Search
CPC .......... F03D 1/04; F03D 3/04; F03D 3/0409; F03D 3/0427; F05B 2240/133; F05B 2240/14
USPC .......................................... 416/189; 415/220
See application file for complete search history.

(56) References Cited

U.S. PATENT DOCUMENTS

| | | | |
|---|---|---|---|
| 4,075,500 | A | 2/1978 | Oman et al. |
| 4,204,799 | A | 5/1980 | de Geus |
| 4,324,985 | A | 4/1982 | Oman |
| 6,655,907 | B2 | 12/2003 | Brock et al. |
| 6,887,031 | B1 | 5/2005 | Tocher |
| 7,218,011 | B2 | 5/2007 | Hiel et al. |

(Continued)

FOREIGN PATENT DOCUMENTS

| | | |
|---|---|---|
| DE | 10036307 A1 | 2/2002 |
| WO | 2010028342 A2 | 3/2010 |

(Continued)

*Primary Examiner* — Ninh H Nguyen
*Assistant Examiner* — Jeffrey A Brownson
(74) *Attorney, Agent, or Firm* — Harris Beach PLLC; Neal L. Slifkin

(57) ABSTRACT

A housing for a wind turbine includes a plurality of spine members with a central rib and opposed channels. Frame members are attached to adjacent spine members. The housing includes divergent frame members having a pair of longitudinal members which are inserted into channels of a spine member. The housing includes central support members, each central support member is attached to a divergent frame member. Each of the central support members is attached near the center of one of the divergent frame members. The housing also includes outer plates, each outer plate attached to and between adjacent spine members. Channels face in the opposite direction from adjacent channels on the spines. An inner shroud is attached to the spine members. Air passages are created underneath the arcuate outer plates. A cowling is attached to the end plates.

16 Claims, 14 Drawing Sheets

(56) References Cited

U.S. PATENT DOCUMENTS

| | | |
|---|---|---|
| D608,736 S | 1/2010 | Brock |
| 2003/0133783 A1 | 7/2003 | Brock et al. |
| 2005/0285407 A1 | 12/2005 | Davis et al. |
| 2009/0180869 A1 | 7/2009 | Brock |
| 2009/0280008 A1 | 11/2009 | Brock |
| 2009/0280009 A1 | 11/2009 | Brock |
| 2010/0086393 A1 | 4/2010 | Presz, Jr. et al. |
| 2010/0284802 A1 | 11/2010 | Presz, Jr. et al. |
| 2010/0308595 A1* | 12/2010 | Chen .................. F03D 1/04 290/55 |
| 2010/0316487 A1 | 12/2010 | Presz, Jr. |
| 2010/0316493 A1 | 12/2010 | Presz, Jr. et al. |
| 2010/0320760 A1 | 12/2010 | Yu et al. |
| 2011/0008164 A1 | 1/2011 | Presz, Jr. |
| 2012/0141266 A1* | 6/2012 | Smyth .................. F03D 1/04 415/213.1 |
| 2012/0275903 A1* | 11/2012 | Brock .................. F03D 1/04 415/121.3 |

FOREIGN PATENT DOCUMENTS

| | | |
|---|---|---|
| WO | 2010036216 A1 | 4/2010 |
| WO | 2011008720 A2 | 1/2011 |
| WO | 2011094569 A1 | 8/2011 |

* cited by examiner

HOUSING FOR A HIGH EFFICIENCY WIND TURBINE

CROSS-REFERENCE TO RELATED APPLICATIONS

The present application is a Continuation-in-Part of a pending U.S. patent application, Ser. No. 13/094,952, filed Apr. 27, 2011, and pending U.S. patent application, Ser. No. 13/238,217, filed Sep. 21, 2011, and pending U.S. patent application, Ser. No. 13/293,326, filed Nov. 10, 2011.

FIELD OF THE INVENTION

The present invention relates to a housing for a wind turbine. More particularly, the present invention relates to framework for construction of the housing for a wind turbine.

BACKGROUND OF THE INVENTION

Wind energy has been used for centuries for a variety of useful purposes including grinding grain and pumping water. Recently, there has been extensive research and development worldwide in technology to use wind to generate electricity. Generating electricity from wind power does not result in the emission of carbon dioxide, hydrocarbons, carbon monoxide, particulates or other harmful compounds. Wind energy is, therefore, an attractive alternative to at least a portion of the power generated by burning fossil fuels in conventional power plants. The use of wind energy also reduces the need for coal mining which can be hazardous to miners and harmful to the environment.

There has been a continuing need and desire for improvements in wind driven power generators, including the desire to overcome the shortcomings of conventional power generators while also providing a generator which is efficient and physically compact. This increasingly competitive source of energy is steadily providing a growing share of worldwide electricity. Significant numbers of these wind turbines have been located in particular areas with high average wind speeds to form wind farms with considerable generating capability. Wind turbines have also been used to generate electricity in off-grid applications such as remote sites.

Traditional wind turbines are typically mounted on tall towers. The towers are often placed in open fields or along a ridgeline. In addition to accessing higher wind speeds, the height of traditional wind turbines reduces or avoids risk to people, livestock, and wildlife that may be on or near the ground. But towers are expensive to build and, at least in some cases, their height may be objectionable, for example, for obstructing a view. Property owners in the vicinity of these wind turbines also have been known to object to the noise caused by the large rotating blades. Many of these traditional wind turbines have blades over 40 meters long, meaning the diameter of the rotor is over 80 meters, mounted on towers 80 meters tall. Land for the wind farm has to be purchased or leased, and transmission line easements have to be obtained from the wind farm to the existing transmission power grid. As a result, the development time is long and costs are very high. Because of these restrictions, many new wind farms cannot be built for several years.

Thus, because of the problems associated with such traditional wind farms, much current research has been devoted to smaller wind turbines. While it is possible to create turbines with a wide range of blade lengths, much recent development has been devoted to turbines with smaller blade lengths than those found in traditional wind turbines. These smaller turbines can be mounted on the roofs of buildings or on poles, which are only a fraction of the height of traditional wind turbine towers. However, typical small wind driven turbines are relatively inefficient, often only converting a small fraction of the wind's kinetic energy into usable electrical power. When these smaller wind turbines have the blades mounted within a housing, the designs allow for greater power extraction out of the wind, compared to prior art open designs. Examples of such wind turbines are found in U.S. Pat. Nos. 7,218,011, 4,204,799, 4,075,500, 6,655,907 and 6,887,031, the disclosures of which are hereby incorporated by reference herein. These smaller scale wind turbines may be mounted on lower poles, such as at a height of 10 meters, or may be mounted on the top of buildings. Thus, the smaller turbines are less expensive to build, and create less of an impact on the environment compared to the traditional larger turbines. The housing surrounding the turbine blades must be lightweight, strong and easy to assemble. The housing and turbine blades must be supported by a pole and must be able to rotate. The housing must also be strong enough so that it will withstand strong winds. The housing must also be easy to construct in the field. A housing is therefore needed which is strong, lightweight and easy to construct.

BRIEF SUMMARY OF THE INVENTION

A housing for a wind turbine is provided which is preferably constructed from steel or aluminum, and surrounds the turbine blades. The housing could be cylindrical, conical, square or other suitable shapes. The housing has an upstream opening and a downstream opening.

The housing includes a plurality of spine members, each spine member having a central rib and opposed channels near one end of the central rib. Preferably, the spine members are made from extruded aluminum, although other materials, such as steel or fiber-reinforced plastic are possible. The opposed channels form an obtuse angle with the central rib. As the size of the framework increases, the angle decreases. Preferably, the angle is greater than 90 degrees and smaller than 120 degrees. An end plate is attached to each spine member. Preferably there are between 12 and 20 spine members, and more preferably, there are 16 spine members.

Frame members are provided which include longitudinal beam members and transverse cross-members at spaced locations along the longitudinal beam members. At least one frame member has a pole cradle at one end. Preferably, two of the frame members opposite each other include pole cradles. The frame members are attached to adjacent spine members.

The housing includes a plurality of divergent frame members, each divergent frame member having a pair of longitudinal members and a plurality of transverse cross-members. The longitudinal members of each divergent frame member are preferably at an angle of between 9 and 20 degrees with respect to one another. Preferably, there are between 6 and 10 divergent frame members. Each longitudinal member is adapted to be inserted into a channel of a spine member.

The housing includes a plurality of central support members, each central support member is adapted to be attached to a divergent frame member. Each central support member has a pair of longitudinal members and a plurality of transverse cross-members attached to the longitudinal members. Preferably, each of the central support members is attached near the center of one of the divergent frame members between the longitudinal cross-members of the divergent frame members. Preferably, there are between 6 and 10 central support members. More preferably, there are 8 central support members, matching the preferred number of divergent frame members.

The housing also includes a plurality of outer plates, each outer plate is attached to and between adjacent spine members. Preferably, the spine members have a channel for receiving the outer plate ends. The channels face in the opposite direction from adjacent channels on the spines, and preferably form an angle of approximately 45 degrees with the central rib. An inner shroud is attached to the spine members. The outer plates are preferably made from fiber-reinforced plastic, although other materials are possible, and are preferably arcuate in shape. Air passages are created underneath the arcuate outer plates. A cowling is attached to the end plates.

BRIEF DESCRIPTION OF THE SEVERAL VIEWS OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

The foregoing and other objects, features, and advantages of the invention will be apparent from the following more particular description of the embodiments of the invention. Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded in an illustrative, rather than a restrictive, sense. FIGS. 1 through 14 show the various embodiments of the invention.

Figure 1:
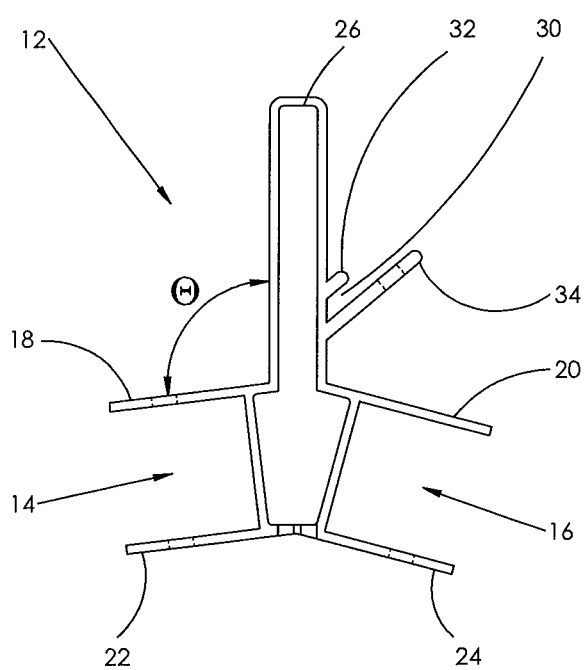
FIG. 1 is a front elevation view of the spine of the present invention.
Figure 2:
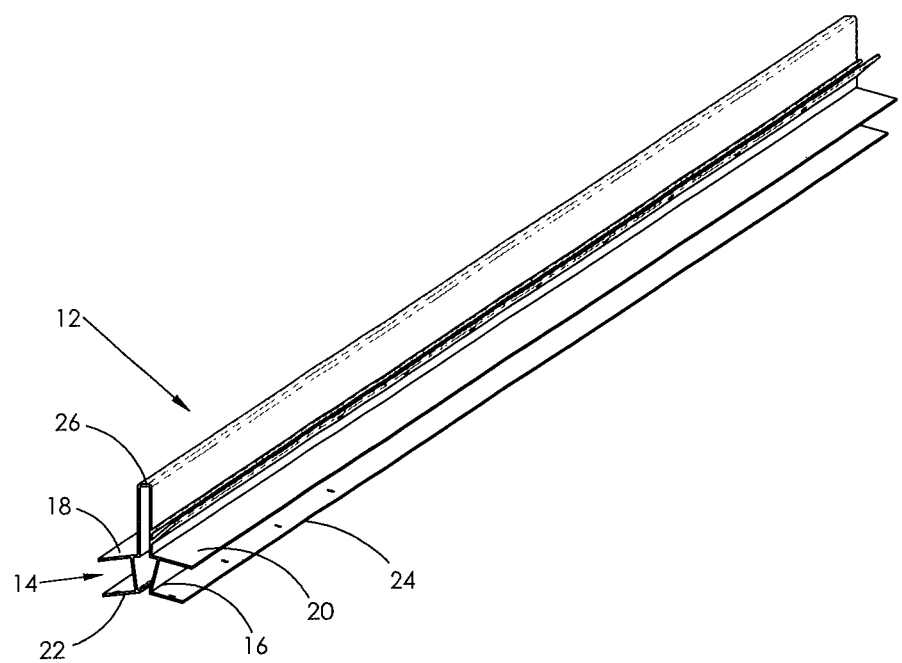
FIG. 2 is a perspective view of the spine of FIG. 1.
Figure 3:
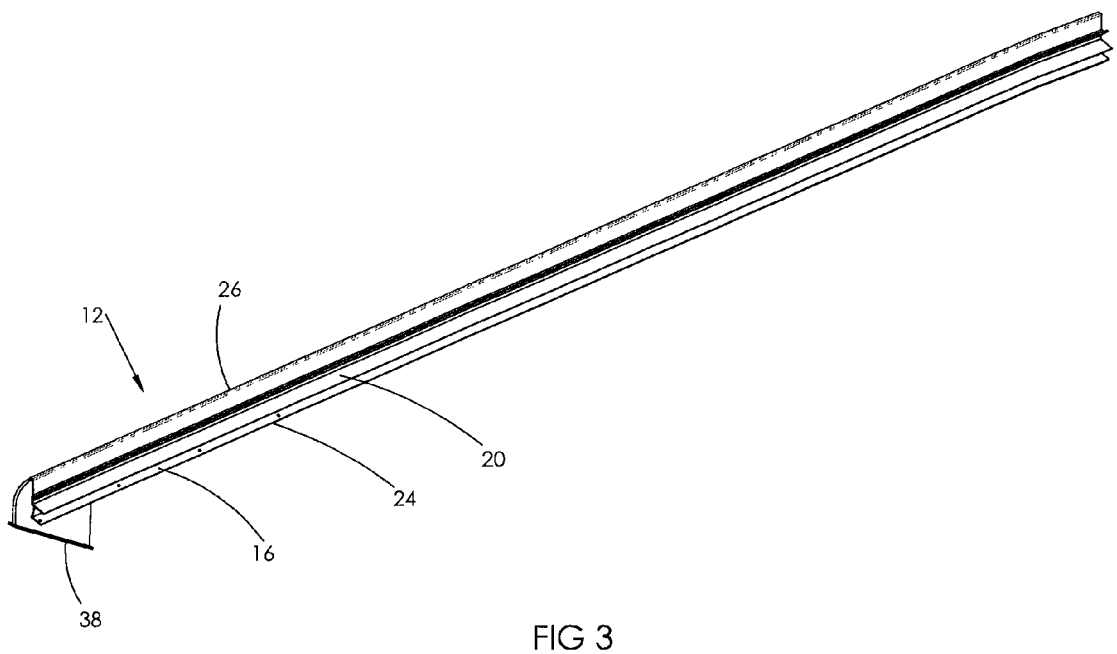
FIG. 3 is a perspective view of the spine of FIG. 2 showing the end plate attached thereto.

FIGS. 1 through 3 illustrate the spine member 12 of the present invention. The spine member 12 includes a pair of channels 14 and 16 constructed from top channel members 18 and 20 and bottom channel members 22 and 24. The opposed channels form an angle $\Theta$ in the range of between 90 degrees and 120 degrees with the central rib 26. The central rib 26 has an outer plate channel 30 constructed from top channel member 32 and bottom channel member 34. It should be noted that in FIG. 1 the outer plate channel 30 is shown facing to the right. However, there will be other spine members (not shown) with the outer plate channel facing to the left. The spine member 12 is preferably constructed from extruded aluminum; however, other lightweight, strong materials can be used instead. FIG. 3 shows an end plate 38 attached to the spine member 12.

Figure 4:
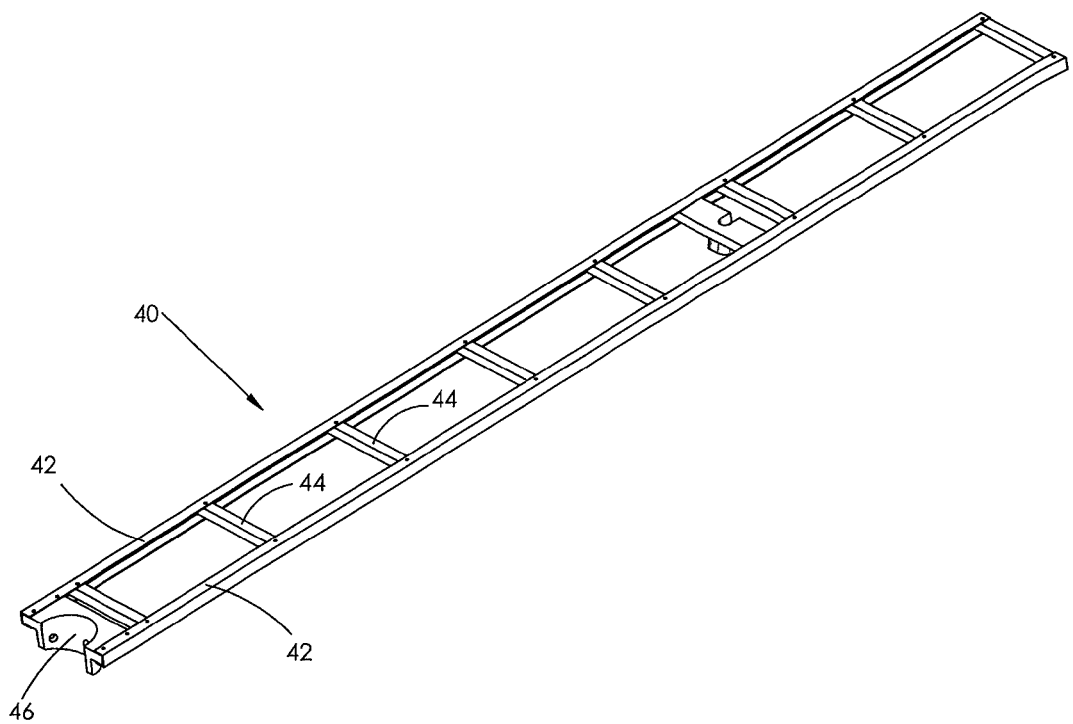
FIG. 4 is a perspective view of the frame member of the present invention.

FIG. 4 illustrates a frame member 40. Each frame member 40 includes longitudinal beam members 42 and transverse cross-members 44 at spaced locations along the longitudinal beam members 42. At least one frame member 40 has a pole cradle 46 at one end. Preferably, two of the frame members opposite each other include pole cradles 46. During construction, the frame members are attached to adjacent spine members 12.

Figure 5:
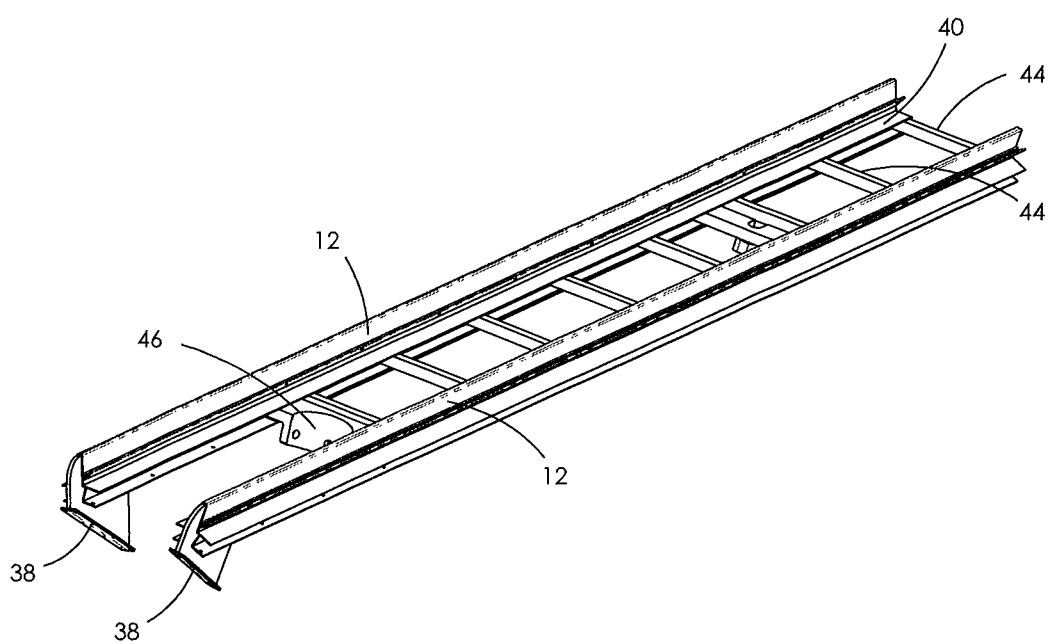
FIG. 5 is a perspective view of the frame member and spines of the present invention.

FIG. 5 illustrates the frame member 40 attached to the spine members 12. At the end of each spine member 12 is the end plate 38.

Figure 6:
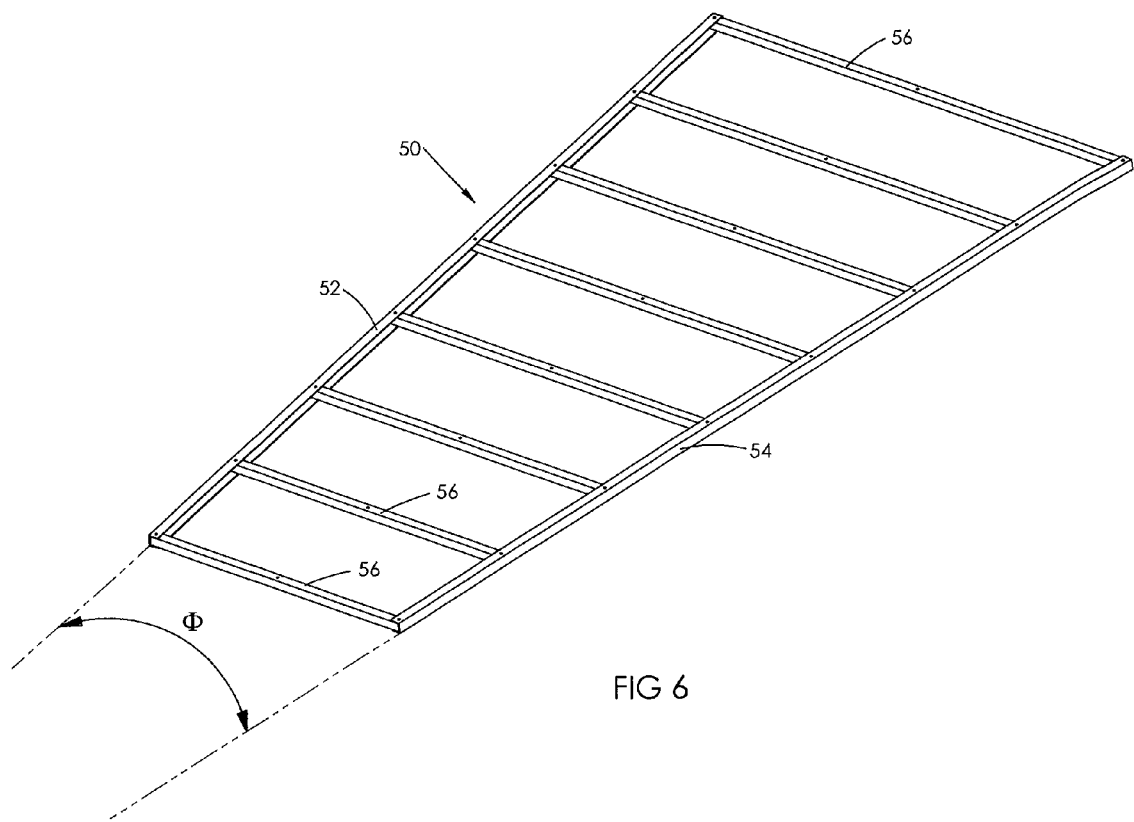
FIG. 6 is a perspective view of the divergent frames of the present invention.
Figure 7:
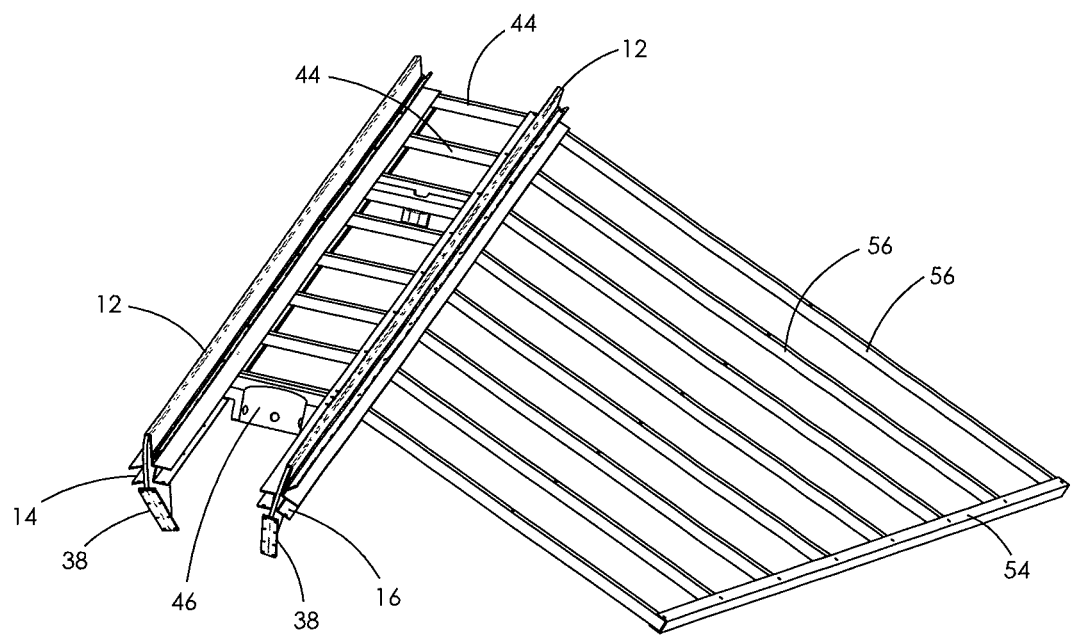
FIG. 7 is a perspective view of the frame member attached to the divergent frame.
Figure 10:
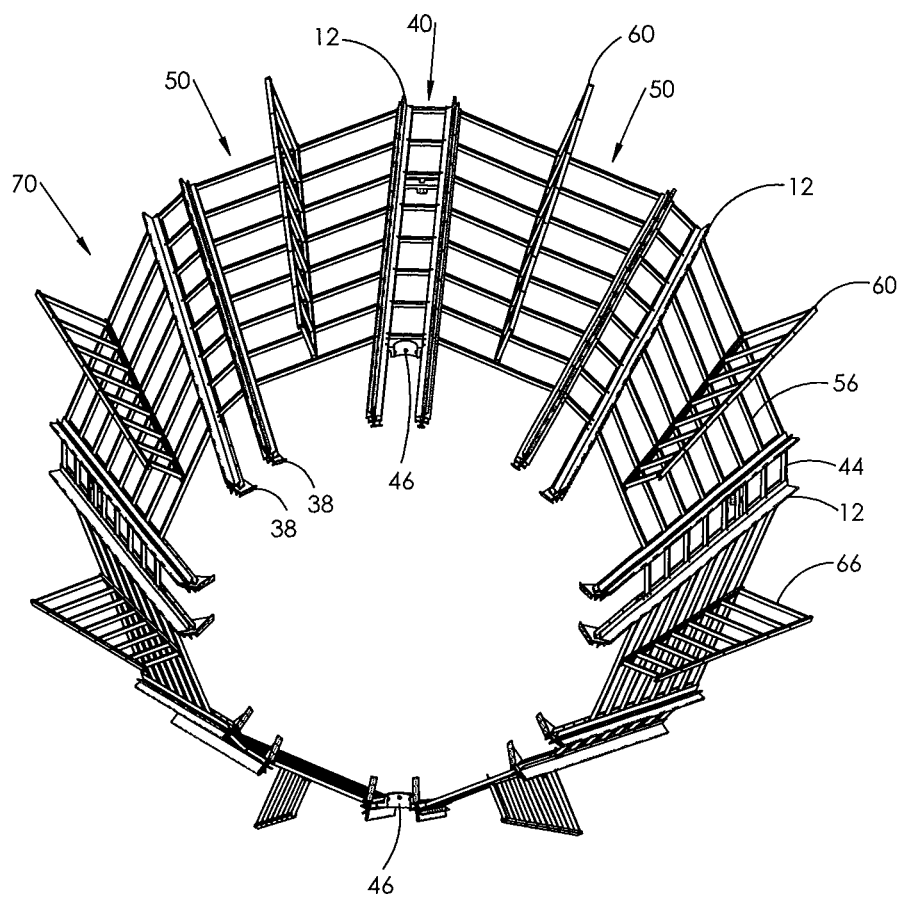
FIG. 10 is a perspective view of a portion of the assembled framework of the present invention.

FIG. 6 illustrates the divergent frame member 50, which has a pair of longitudinal members 52 and 54 and a plurality of transverse cross-members 56. The longitudinal members 52 and 54 of each divergent frame member 50 are preferably at an angle $\Phi$ of between 9 degrees and 20 degrees with respect to one another. Preferably, there are between 6 and 10 divergent frame members 50 in the assembled framework 70 (FIG. 10). Each longitudinal member 52 and 54 is adapted to be inserted into a channel 14 or 16 of a spine member 12. As illustrated in FIG. 7.

Figure 8:
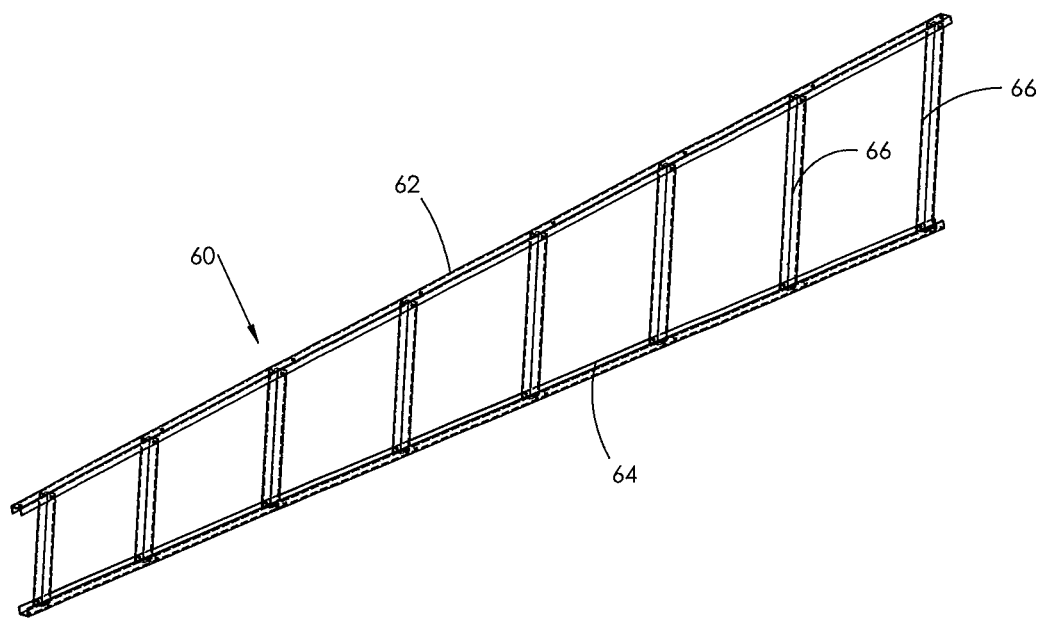
FIG. 8 is a perspective view of the center support of the present invention.
Figure 9:
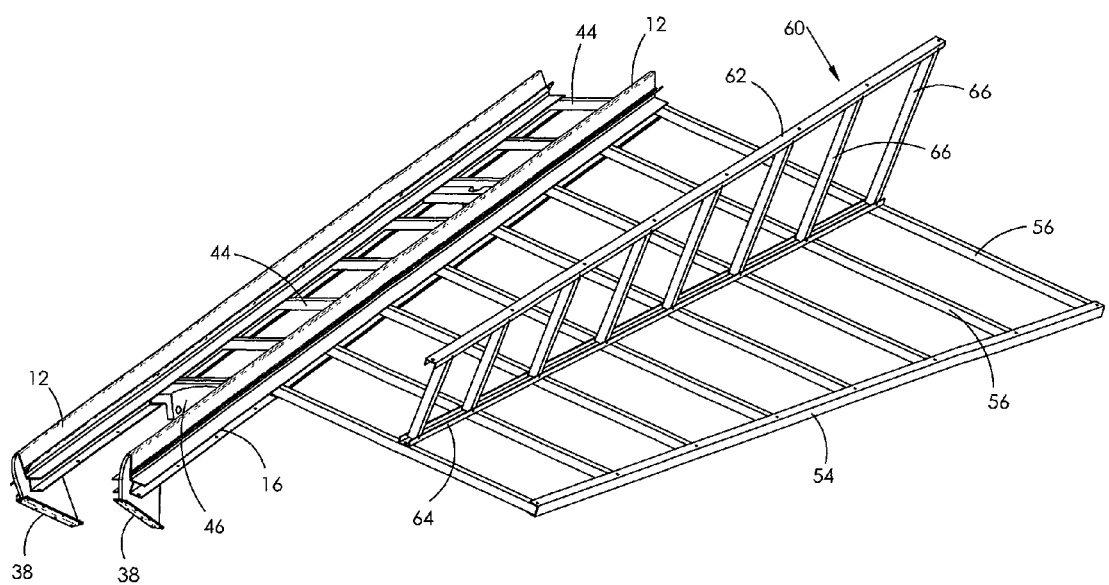
FIG. 9 is a perspective view of the center support attached to the divergent frame.

FIG. 8 illustrates the central support member 60. Each central support member 60 is adapted to be attached to a divergent frame member 50. Each central support member 60 has a pair of longitudinal members 62 and 64 and a plurality of transverse cross-members 66 attached to the longitudinal members 62 and 64. Preferably, each of the central support members 60 is attached near the center of one of the divergent frame members 50 between the longitudinal cross-members 52 and 54 of the divergent frame members 50, as shown in FIG. 9.

FIG. 10 illustrates the assembled framework 70. In this embodiment, there are eight frame members 40, eight divergent frame members 50 and eight central support members 60.

Figure 11:
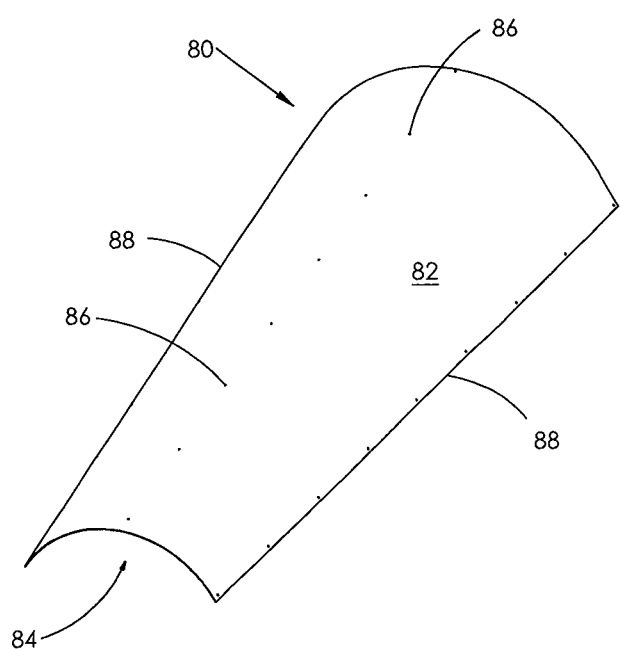
FIG. 11 is a perspective view of the outer plate of the present invention.
Figure 12:
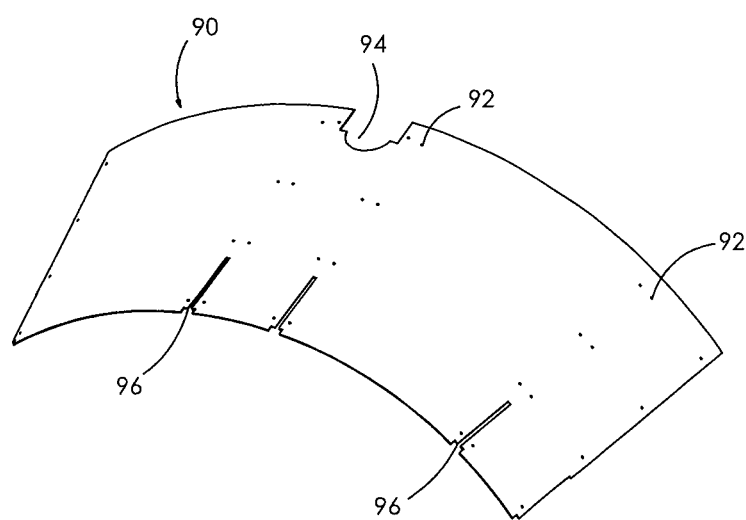
FIG. 12 is a perspective view of the inner shroud of the present invention.

FIG. 11 illustrates an outer plate 80. The outer plate 80 has a convex upper surface 82 and a concave lower surface 84. Preferably, the outer plate 80 includes a plurality of bolt holes 86 for attachment to the framework 70. It will be understood that the assembled framework 70 will have a plurality of outer plates 80; each outer plate 80 is attached to and between adjacent spine members 12. The ends 88 of the outer plate 80 are inserted into the channels 30 for receiving the outer plate ends. FIG. 12 illustrates an inner shroud section 90. The inner shroud section 90 includes holes 92 for attaching the inner shroud 90 to the framework 70, a cutout 94 for the pole (not shown) and slots 96 to receive the end plate 38. The inner shroud section 90 is attached to the spine members 12.

Figure 13:
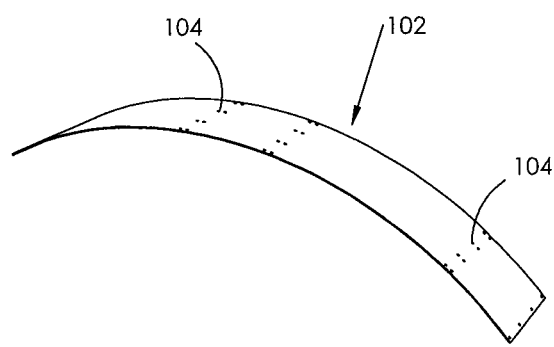
FIG. 13 is a perspective view of the cowling of the present invention.
Figure 14:
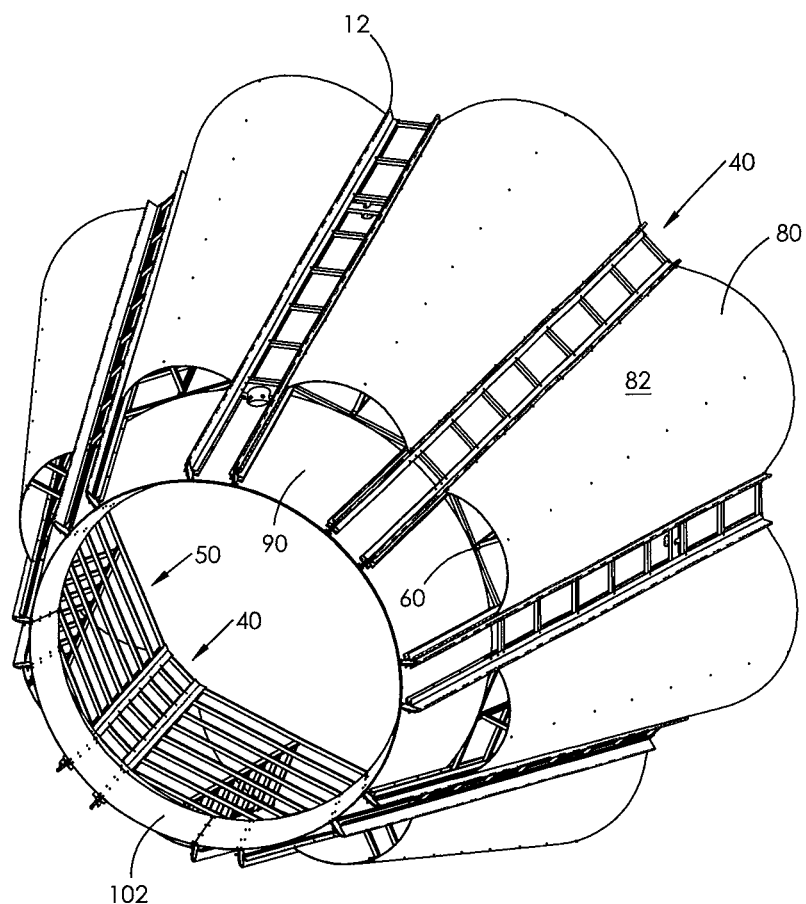
FIG. 14 is a perspective view of the fully assembled framework of the present invention.

FIG. 13 illustrates a cowling section 102 with bolt holes 104 for attaching the cowling section 102 to the framework 70. FIG. 14 illustrates the assembled housing 110 with the various components discussed above.

It is to be understood that the exemplary embodiments are merely illustrative of the present invention and that many variations of the above-described embodiments can be devised by one skilled in the art without departing from the scope of the invention.

The invention claimed is:

1. A housing for a wind turbine for extracting energy out of an airflow, the housing comprising:
   a plurality of spine members, each spine member having a central rib and opposed channels near one end of the central rib, the opposed channels forming an angle in the range of 90 degrees to 120 degrees with the central rib;
   an end plate attached to each spine member;
   a plurality of frame members including longitudinal members and transverse cross-members at spaced locations along the longitudinal members, at least one frame member having a pole cradle at one end thereof, each of the frame members attached to adjacent spine members;
   a plurality of divergent frame members, each divergent frame member having a pair of longitudinal members and a plurality of transverse cross-members, each longitudinal member adapted to be inserted into one of the channels of one of the spine members;
   a plurality of central support members, each central support member adapted to be attached to one of the plurality of divergent frame members, each central support member having a pair of longitudinal members and a plurality of transverse cross-members attached to the longitudinal members;
   a plurality of plates, each plate attached to and between adjacent spine members;
   a plurality of inner shroud members, each of the plurality of inner shroud members attached on each side thereof to one of the plurality of spine members; and
   a plurality of cowling members, each attached on each side thereof to one of the plurality of end plates.

2. The housing of claim 1 wherein each of the central support members is attached near the center of one of the divergent frame members between the longitudinal cross-members of the divergent frame members.

3. The housing of claim 1 wherein the spine members are made of extruded aluminum.

4. The housing of claim 1 wherein the outer plates are made of fiber-reinforced plastic.

5. The housing of claim 1 wherein the plurality of central support members comprises between 6 and 10 central support members.

6. The housing of claim 1 wherein the plurality of central support members comprises 8 central support members.

7. The housing of claim 1 wherein the plurality of spine members comprises between 12 and 20 spine members.

8. The housing of claim 1 wherein the plurality of spine members comprised 16 spine members.

9. The housing of claim 1 wherein two of the frame members include pole cradles, and wherein the pole cradles are opposed to one another.

10. The housing of claim 1 wherein the outer plates are arcuate in shape.

11. The housing of claim 1 further including air passages underneath the arcuate outer plates.

12. The housing of claim 11 wherein the plurality of central support members comprises between 6 and 10 central support members.

13. The housing of claim 1 wherein the longitudinal members of each divergent frame member are at an angle of approximately 9 degrees to 20 degrees with respect to one another.

14. The housing of claim 1 wherein each of the spine members have outer plate channels for receiving a portion of the outer plates.

15. The housing of claim 14 wherein a first portion of the outer plate channels of the spine members face in a direction opposite from a second portion of the outer plate channels.

16. The housing of claim 15 wherein the outer plate channels form an angle of approximately 45 degrees with the central rib of the spine members.

* * * * *